United States Patent
Jain et al.

(10) Patent No.: US 10,055,398 B2
(45) Date of Patent: Aug. 21, 2018

(54) METHOD AND SYSTEM FOR PROVIDING RECOMMENDATIONS AND PERFORMING ACTIONS BASED ON SOCIAL UPDATES IN SOCIAL NETWORKS

(71) Applicant: Samsung Electronics Co., Ltd., Suwon-si, Gyeonggi-do (KR)

(72) Inventors: Arihant Jain, Noida (IN); Kuldip Agrawal, Noida (IN); Shivsharad Dhiman, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 14/543,034

(22) Filed: Nov. 17, 2014

(65) Prior Publication Data
US 2015/0142835 A1  May 21, 2015

(30) Foreign Application Priority Data
Nov. 18, 2013 (IN) ............... 5301/CHE/2013

(51) Int. Cl.
| | |
|---|---|
| *G06F 17/30* | (2006.01) |
| *G06F 17/27* | (2006.01) |
| *H04L 12/18* | (2006.01) |
| *G06Q 50/00* | (2012.01) |
| *H04L 12/58* | (2006.01) |

(52) U.S. Cl.
CPC .... *G06F 17/2705* (2013.01); *G06F 17/30424* (2013.01); *G06F 17/30985* (2013.01); *G06Q 50/01* (2013.01); *H04L 12/1813* (2013.01); *H04L 51/32* (2013.01)

(58) Field of Classification Search
CPC .......... G06F 17/2705; G06F 17/30424; G06F 17/30985; G06Q 50/01; H04L 51/32; H04L 12/1813
USPC ....................................... 707/755
See application file for complete search history.

(56) References Cited

U.S. PATENT DOCUMENTS

| | | | |
|---|---|---|---|
| 6,269,369 B1* | 7/2001 | Robertson | G06Q 10/02 |
| 8,010,602 B2* | 8/2011 | Shen | H04W 4/21 |
| | | | 709/204 |
| 8,402,094 B2* | 3/2013 | Bosworth | G06Q 30/08 |
| | | | 705/319 |
| 8,862,102 B2* | 10/2014 | Karandikar | G06Q 30/02 |
| | | | 455/414.1 |
| 9,288,638 B2* | 3/2016 | Ankolekar | H04W 4/08 |
| 9,680,990 B2* | 6/2017 | Papakipos | H04L 51/046 |

(Continued)

OTHER PUBLICATIONS

Berjani, Betim, et al., "A Recommendation System for Spots in Location-Based Online Social Networks", SNS 11, Salzburg, Austria, Apr. 10, 2011, 6 pages.*

(Continued)

*Primary Examiner* — Robert Stevens
(74) *Attorney, Agent, or Firm* — Jefferson IP Law, LLP

(57) ABSTRACT

A method and system for providing recommendations based on status messages of contacts added in social networks is provided. The method includes parsing one or more status messages of one or more contacts added in one or more social networks. Further, the method includes extracting information from the one or more status messages. Furthermore, the method includes providing at least one recommendation to a user based on the extracted information.

12 Claims, 13 Drawing Sheets

(56) References Cited

U.S. PATENT DOCUMENTS

| | | | | |
|---|---|---|---|---|
| 2005/0203929 A1* | 9/2005 | Hazarika | G06F 17/3053 | |
| 2007/0157108 A1* | 7/2007 | Bishop | H04L 67/36 | 715/771 |
| 2010/0057859 A1* | 3/2010 | Shen | G06Q 10/107 | 709/206 |
| 2010/0062753 A1* | 3/2010 | Wen | H04M 1/27455 | 455/418 |
| 2010/0245262 A1* | 9/2010 | Vance | G06Q 10/107 | 345/173 |
| 2010/0274847 A1* | 10/2010 | Anderson | G06F 15/16 | 709/203 |
| 2010/0306185 A1* | 12/2010 | Smith | G06Q 10/107 | 707/709 |
| 2011/0035452 A1* | 2/2011 | Gittleman | G06Q 10/107 | 709/206 |
| 2011/0131219 A1* | 6/2011 | Martin-Cocher | H04L 29/12047 | 707/754 |
| 2012/0233238 A1* | 9/2012 | Braginsky | G06Q 30/0261 | 709/203 |
| 2012/0233256 A1* | 9/2012 | Shaham | G06F 17/30873 | 709/204 |
| 2012/0266107 A1* | 10/2012 | Bates | G06F 17/30575 | 715/838 |
| 2013/0066922 A1* | 3/2013 | Jang | G06F 17/30575 | 707/802 |
| 2013/0226958 A1* | 8/2013 | Pianko | G06F 17/30581 | 707/769 |
| 2013/0227018 A1* | 8/2013 | Regan | H04L 51/32 | 709/204 |
| 2013/0246520 A1* | 9/2013 | Belvin | G06Q 10/10 | 709/204 |
| 2014/0019409 A1* | 1/2014 | Tseng | G06F 17/30575 | 707/609 |
| 2014/0101247 A1* | 4/2014 | Pappas | H04L 67/22 | 709/204 |
| 2014/0185489 A1* | 7/2014 | Efrati | H04M 1/274583 | 370/259 |
| 2014/0187213 A1* | 7/2014 | Shuster | H04W 4/023 | 455/414.1 |

OTHER PUBLICATIONS

Merriam Webster's Collegiate Dictionary, 10th Edition, © 2000, p. 359.*

Microsoft Computer Dictionary, 4th Edition, Microsoft Press, Redmond, WA, © 1999, p. 333.*

Zhang, Daqing, et al., "Extracting Social and Community Intelligence from Digital Footprints: An Emerging Research Area", UIC 2010, LNCS 6406, Springer-Verlag, Berlin, Germany, © 2010, pp. 4-18.*

Bonneau, Joseph, et al., "Prying Data out of a Social Network", ASONAM 2009, Athens, Greece, Jul. 20-22, 2009, IEEE Computer Society, pp. 249-254.*

Nardi, Bonnie A., et al., "Integrating Communication and Information Through ContactMap", Communications of the ACM, vol. 45, No. 4, Apr. 2002, pp. 89-95.*

Auto Sync App Data, retrieved Nov. 11, 2014, pp. 1-21.

LEEK, Information Extraction Using Hidden Markov Models, University of California, San Diego, 1997, pp. 1-45.

Data Mining (Natural Language Processing), Wikipedia, retrieved Nov. 11, 2014, 9 pages.

Phonebook 2.0, retrieved Nov. 11, 2014, 2 pages.

* cited by examiner

METHOD AND SYSTEM FOR PROVIDING RECOMMENDATIONS AND PERFORMING ACTIONS BASED ON SOCIAL UPDATES IN SOCIAL NETWORKS

TECHNICAL FIELD

The present invention relates to the field of social networking, and more specifically to the field of providing recommendations and performing actions based on social updates in social networks.

BACKGROUND

Social applications such as, LinkedIn®, ChatOn®, GoogleTalk®, Facebook®, and Instant Messaging Applications are a key tool for communication on the Internet. Scores of users utilize the social applications to establish connection among numerous contacts, generally termed as social networking. Typically, smart phones that facilitate social networking are a prominent and indispensable tool for users to communicate.

A common feature offered by the social applications is communicating through status messages. Time and again, contacts in a social account update the status messages. Keeping track over updated status messages is cumbersome and becomes a challenge with the increasing number of contacts. For example, when a user moves from Delhi to Pune for a period of six months, it is apparent that the user updates his status message to communicate his new contact number during the period. However, many at times, the contacts fail to notice the updated status message.

Further, smart phones provide a feature to synchronize a phone book with social accounts. Another feature of smart phones provides notifications to the user on the occurrence of activities that happen over the Internet such as chat messages, social updates and changes in photos. Plenty of applications are developed based on the feature of synchronizing social data with address books. The features in smart phones such as "Auto Sync App Data" and "Phonebook 2.0" are capable of extracting status messages from social networks. However, extracting a phone number and updating a contact book accordingly is not provided by the existing features. Moreover, extracting any other useful information from the status messages is not available.

In light of the foregoing discussion there is a need for an efficient method and system for providing recommendations and performing actions based on the social updates in social networks.

SUMMARY

Embodiments of the present disclosure described herein provide a method and system for providing recommendations and performing actions based on status messages and social updates in social networks.

An example of a method for providing recommendations based on status messages of contacts added in social networks. The method includes parsing one or more status messages of one or more contacts added in one or more social networks. Further, the method includes extracting information from the one or more status messages. Furthermore, the method includes providing at least one recommendation to a user based on the extracted information.

An example of a method for performing actions based on status messages of contacts added in social networks. The method includes parsing one or more status messages of one or more contacts added in one or more social networks. Further, the method includes extracting information from the one or more status messages. Furthermore, the method includes performing at least one action to a user based on the extracted information.

An example of a method for providing recommendations based on social updates of contacts added in social networks. The method includes parsing one or more social updates of one or more contacts added in one or more social networks. Further, the method includes extracting information from the one or more social updates. Furthermore, the method includes providing at least one recommendation to a user based on the extracted information.

An example of a method for performing actions based on social updates of contacts added in social networks. The method includes parsing one or more social updates of one or more contacts added in one or more social networks. Further, the method includes extracting information from the one or more social updates. Furthermore, the method includes performing at least one action based on the extracted information.

An example of a system for providing recommendations based on social updates in social networks includes parser to parse one or more social updates of contacts connected in social networks. The parser identifies an update in the social update. Further, the system includes a processor module operable to extract information from the one or more social updates. Furthermore, the system includes a recommendation module to provide at least one recommendation to a user based on the extracted information.

An example of a system for performing actions based on social updates in social networks includes a parser to parse one or more social updates of contacts connected in social networks. The parser identifies an update in the social update. Further, the system includes a processor module operable to extract information from the one or more social updates. Furthermore, the system includes an action module to perform at least one action directly based on the extracted information.

The features and advantages described in this summary and in the following detailed description are not all-inclusive, and particularly, many additional features and advantages will be apparent to one of ordinary skill in the relevant art in view of the drawings, specification, and claims hereof Moreover, it should be noted that the language used in the specification has been principally selected for readability and instructional purposes, and may not have been selected to delineate or circumscribe the inventive subject matter, resort to the claims being necessary to determine such inventive subject matter. An embodiment of the present invention provides a device communication system, including: a communication interface configured to receive a wireless signal strength for locating a wireless enabled device; a control interface, coupled to the communication interface, configured to measure the wireless signal strength; a user interface, coupled to the control interface, configured to receive a left acoustic signal and a right acoustic signal for determining an acoustic direction; and a control unit, coupled to the user interface, configured to form a peer-to-peer network connection based on the wireless signal strength and the acoustic direction for displaying on the wireless enabled device.

BRIEF DESCRIPTION OF THE DRAWINGS

The accompanying figure, similar reference numerals may refer to identical or functionally similar elements.

These reference numerals are used in the detailed description to illustrate various embodiments and to explain various aspects and advantages of the present disclosure.

FIG. 1 is a device communication system with proximity synchronization mechanism in an embodiment of the present invention.

DETAILED DESCRIPTION

Embodiments of the present disclosure described herein provide a method and system for providing recommendations and performing actions based on social updates in social networks. Examples of social updates include, but are not limited to, status messages and notifications (or messages) that appear on the user's home page (or profile) such as events, uploading photos and editing photo albums. Social applications (also referred to as social networks) offer web-based services and provide means for users to interact over the Internet, such as e-mail, instant messaging, posting comments, information, messages and images. Examples of social application include, but are not limited to, Facebook®, Twitter®, GTalk®, Linkedin® and MySpace®. Further, social applications allow users to share ideas, pictures, post, activities, events and interests with other people in their network. Eventually, people are able to communicate and collaborate among themselves.

The following detailed description is intended to provide exemplary implementations to one of ordinary skill in the art, and is not intended to limit the invention to the explicit disclosure, as one or ordinary skill in the art will understand that variations can be substituted that are within the scope of the invention as described.

Figure 1:
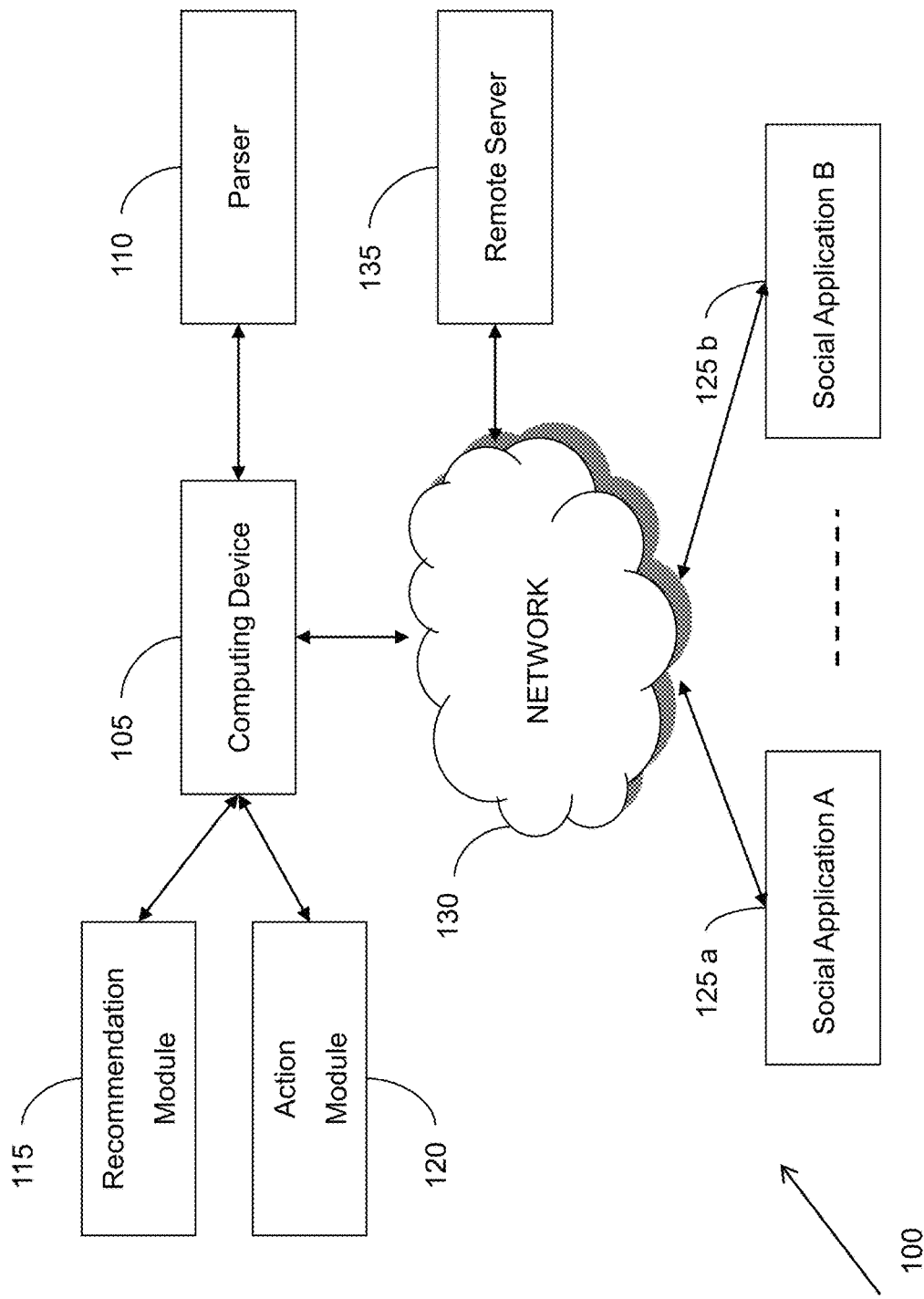
FIG. 1 is a block diagram of an environment, in accordance with which various embodiments of the invention can be implemented.

FIG. 1 is a block diagram of an environment, in accordance with which various embodiments can be implemented. The environment 100 includes a computing device 105, a parser 110, a recommendation module 115, an action module 120 and a plurality of social applications, for example social application A 125a and social application B 125b. The environment 100 also includes a remote server 135. A user of the computing device 105 connects to a desired social application over a network 130. Examples of the computing device 105 include but are not limited to a mobile phone, a tablet device, a personal digital assistant (PDA), a smart phone and a laptop. The parser 110 parses updated status messages and social updates from the social applications. Further, the parser 110 extracts information from the updated status messages and social updates using various techniques. The parser 110 also verifies the extracted information for duplicity. In some embodiments, any other detection method can also be used. The recommendation module 115 provides recommendations to the user based on the extracted information in the updated status messages and social updates in the social applications. The action module 120 is used to perform actions based on the extracted information in the updated status messages and social updates in the social applications. Examples of the social applications include, but are not limited to chat messengers such as GTalk®, Facebook® and Linkedin®. The network 130, for example, the Internet, allows a user of the computing device 105 to connect to the social applications.

Frequently, a user of the computing device 105 connects to a desired social application, for example Facebook®, through the network 130. In some embodiments, the user can connect to a plurality of social applications. For example, the user can connect to LinkedIn® and at the same time log into GTalk®. The social application allows the user to convey a message to connected contacts by means of a status message. In some embodiments, several social applications provide default status messages. Examples of status messages and corresponding meanings include, but are not limited to:

"In a meeting"—signifies that the contact is in a meeting at that point of time.

"Busy, do not disturb"—signifies that the contact is busy and does not want to be interrupted.

"In Paris for two weeks"—signifies that the contact is in London for the next two weeks.

"My new phone number is 9882837014"—signifies that the contact has a new phone.

"Party at John's house this weekend"—signifies that a party is planned at John's house.

Typically, status messages are random text strings in different languages on the social applications and can be updated at any point of time by corresponding contacts. Such updates to the status message are parsed by the parser 110. Consequently, information from the updated status message is extracted. The parser 110 verifies the information extracted for duplicity. Based on the extracted information, various recommendations are provided to the user by the recommendation module 115. Further, based on the extracted information, one or more actions are performed by the action module 120.

In some embodiments, at least one of parsing social updates and extracting information from the social updates is performed (also referred as remote processing) on the remote server 135. Subsequently, recommendations are provided to the user on the computing device 105. Alternatively, actions are performed directly on the computing device 105.

Figure 2:
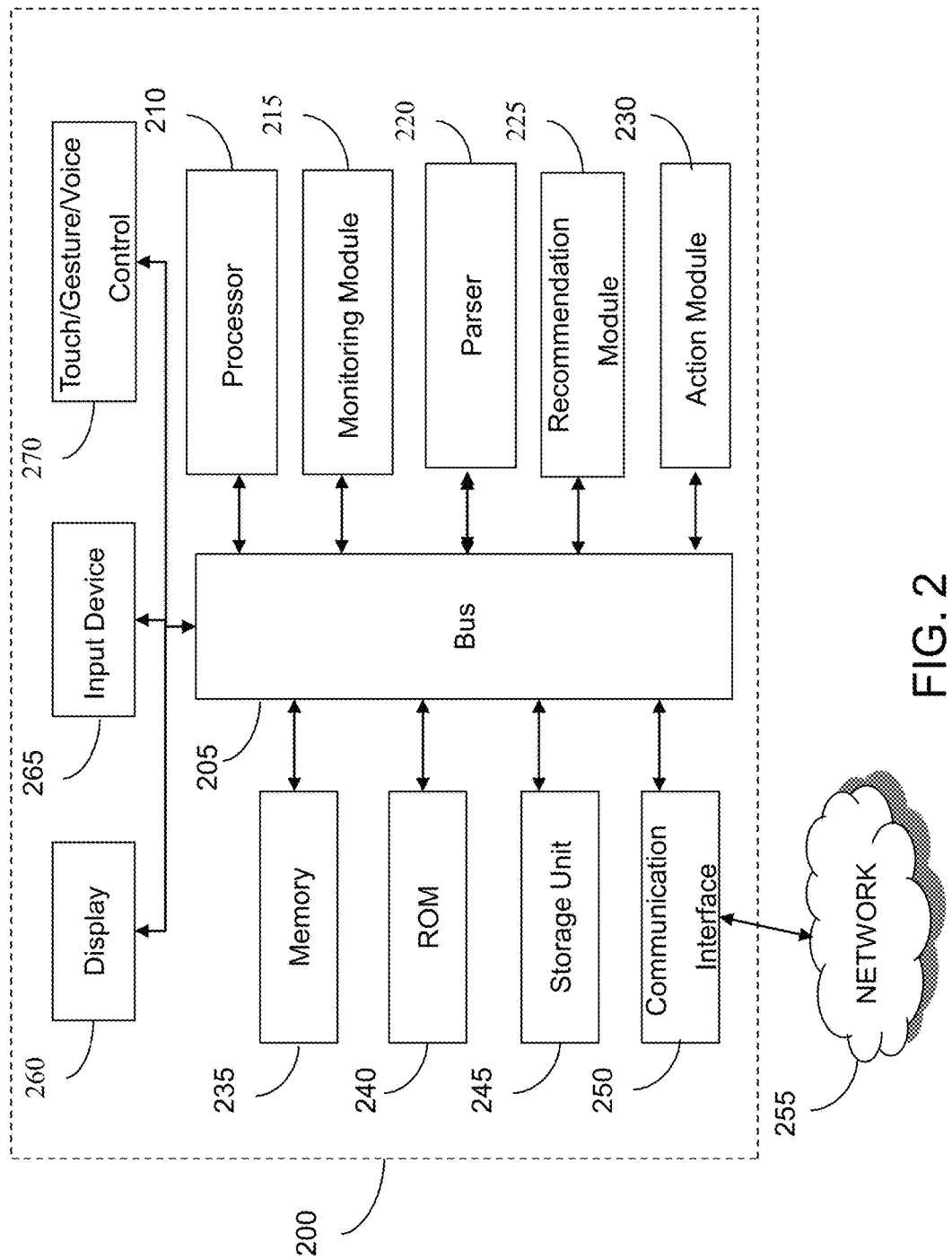
FIG. 2 is a block diagram of a system, in accordance with one embodiment.

FIG. 2 is a block diagram of a system, in accordance with one embodiment.

The system includes a computing device 200 includes a bus 205 or other communication mechanism for communicating information. The computing device 200 includes a processor 210, a monitoring module 215, a parser 220, a recommendation module 225 and an action module 230 coupled with the bus 405. The processor 210 can include an integrated electronic circuit for processing and controlling functionalities of the computing device 200. Further, the monitoring module 215 is used to continuously observe for an update in status messages of contacts connected through the social application. The parser 220 parses such updated status messages and social updates and extracts information using various techniques (for example, Natural Language Processing (NLP)). Further, the parser 220 checks for duplicity of the information extracted. Typically, the information is meaningful and useful data. The recommendation module 225 is used to provide recommendations to the user based on the information extracted. The action module 230 is used to perform actions to the user based on the information extracted. The computing device 200 also includes a memory 235, such as a random access memory (RAM) or other dynamic storage device, coupled to the bus 205 for storing information which can be used by the processor 210. The memory 235 can be used for storing any temporary information required. The computing device 200 further includes a read only memory (ROM) 240 or other static storage device coupled to the bus 205 for storing static information for the processor 210. A storage unit 245, such as a magnetic disk or optical disk, is provided and coupled to the bus 205 for storing information.

Various embodiments are related to the use of the computing device 200 for implementing the techniques described herein. In one embodiment, the techniques are performed by the processor 210 using information included in the memory 235. The information can be read into the memory 235 from another machine-readable medium, such as the storage unit 245. The instructions are stored in the memory 235.

The term "machine-readable medium" as used herein refers to any medium that participates in providing data that causes a machine to operate in a specific fashion. In an embodiment implemented using the computing device 200, various machine-readable medium are involved, for example, in providing information to the processor 210. The machine-readable medium can be a storage media. Storage media includes both non-volatile media and volatile media. Non-volatile media includes, for example, optical or magnetic disks, such as the storage unit 245. Volatile media includes dynamic memory, such as the memory 235. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge. In another embodiment, the machine-readable medium can be a transmission media including coaxial cables, copper wire and fibre optics, including the wires that include the bus 205. Transmission media can also take the form of acoustic or light waves, such as those generated during radio-wave and infra-red data communications. The computing device 200 also includes a communication interface 250 coupled to the bus 405. The communication interface 250 provides a two-way data communication coupling to the Network 255.

The computing device 200 can be coupled via the bus 205 to a display 260, such as but not limited to a liquid crystal display (LCD), a large format display (LFD), a light emitting diode (LED) display or plasma, for displaying television programming, menus, information, advertising and other informative messages. An input device 265 is coupled to the bus 205 for communicating an input to the processor 210. The input device 265 can be included in the computing device 200. Another type of user input device is a Touch, Gesture, or Voice control 270, such as a swipe, pattern, and voice recognition or cursor direction keys for communicating the input to the processor 210 and for controlling cursor movement on the display 260. The input device 265 can also be included in the display 260, for example a touch screen.

Figure 3:
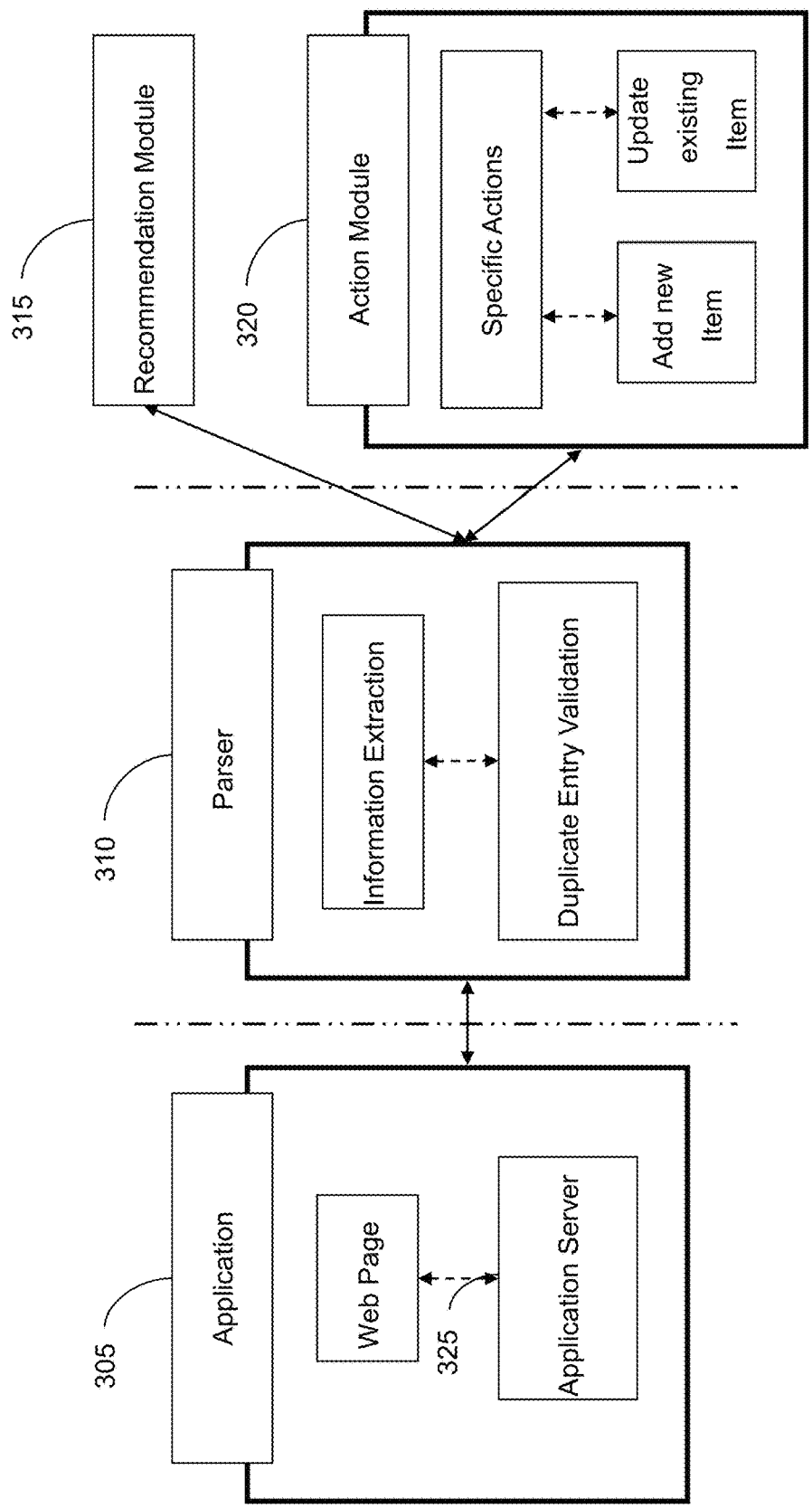
FIG. 3 illustrates an overall operation diagram of the proposed invention, in accordance with one embodiment.

FIG. 3 illustrates an overall operation diagram of the proposed invention, in accordance with one embodiment.

The social applications facilitate the user to share ideas, pictures, post activities, events and interests with other people in their network. Moreover, a common practice today involves in the user posting messages (herein referred to as status messages) that appear automatically to other contacts connected in the network of the social applications. The status messages convey the user's current status, mood, location and activity to the other contacts. Further, the status messages are often updated much more frequently to communicate a message instantly. Social updates are also a common practice that involves in updating status messages and notifications that appear on the user's home page. Examples of notifications include, but are not limited to events, uploading photo albums and editing photo albums.

The overall operation diagram includes an application 305, a parser 310, a recommendation module 315 and an action module 320. The application 305 can be a desktop web browser (for example, Microsoft Internet Explorer, Mozilla Firefox, or Chrome), a mobile browser, a web viewer built into an application program or a widget. The widget is a small application or component of an interface that can be installed and executed within a web page. The widget captures a part of the web page to enable the user to access a service or perform a function. The application 305 interacts with an application server 325. Further, the user interacts with an application server 325 of user added accounts to obtain updates directly from social applications. In some embodiments, the user interacts with a plurality of application servers.

The parser 310 parses a plurality of status messages and social updates of contacts to identify an updated status message in a connected social application. In some embodiments, a single status message can also be parsed. The updated status message and social updates may include meaningful and useful information which is extracted using techniques such as Natural Language Processing. Further, the parser 310 also checks for duplicity of the extracted information. At this point of time, the information extracted is checked for duplicity. A duplicate entry validation is performed by the parser 310. If the information is a replica then recommendations are not provided to the user. On the other side, if the information not a replica then corresponding recommendations are provided to the user.

The recommendation module 315 is used to provide recommendations to the user based on the information extracted. The user has the choice to select a recommendation or reject the recommendation. For example, a new contact can be added in the phonebook. Similarly, a phone number of an existing contact can be updated.

The action module 320 is used to perform specific actions directly based on the information extracted. Exemplary actions include adding a new item and updating an existing item in a database or in a device memory.

Figure 4:
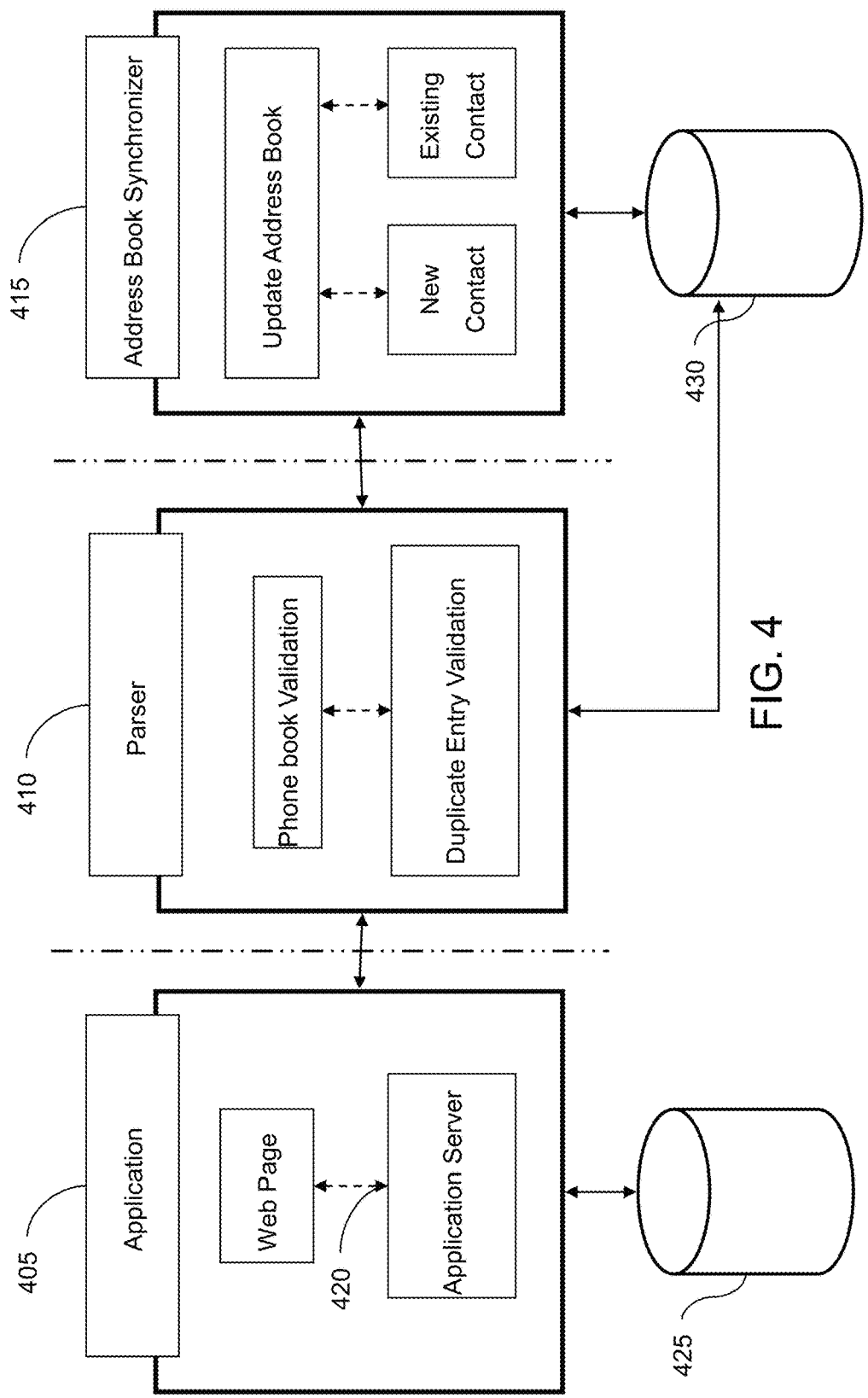
FIG. 4 is an exemplary representation of an overall operation diagram for updating address book, in accordance with one embodiment.

FIG. 4 is an exemplary representation of an overall operation diagram for updating an address book, in accordance with one embodiment.

A widespread action observed in smart phones synchronized with social networks is updating the address book with social network data. The address book stores details, such as name, address and phone number of all contacts connected in the social applications.

In this scenario of updating the address book, the overall operation diagram includes an application 405, a parser 410 and an address book synchronizer 415. The application 405 is one of a web browser and a widget that interacts with an application server 420. Functions of the web browser, widget and the application server 420 are defined above. An application server database 425 is connected to the application server 420. Further, a phone book database 430 is connected to the parser 410 and the address book synchronizer 415.

The parser 410 identifies social updates in the social applications installed on a device. Further, the parser 410 parses updated status messages from the connected social applications. If an update about a new contact number is found, then the contact number is extracted from the status message. The parser 410 checks if the phone number extracted is a duplicate. If the phone number is validated to be a duplicate entry, no action is performed on the phone book database 430. Contrary, a new phone number is updated in the phone book database 430.

The address book synchronizer 415 is used to update the address book. A new contact is added in the address book. Similarly, the extracted phone number can be updated to an existing contact in the address book.

Figure 5:
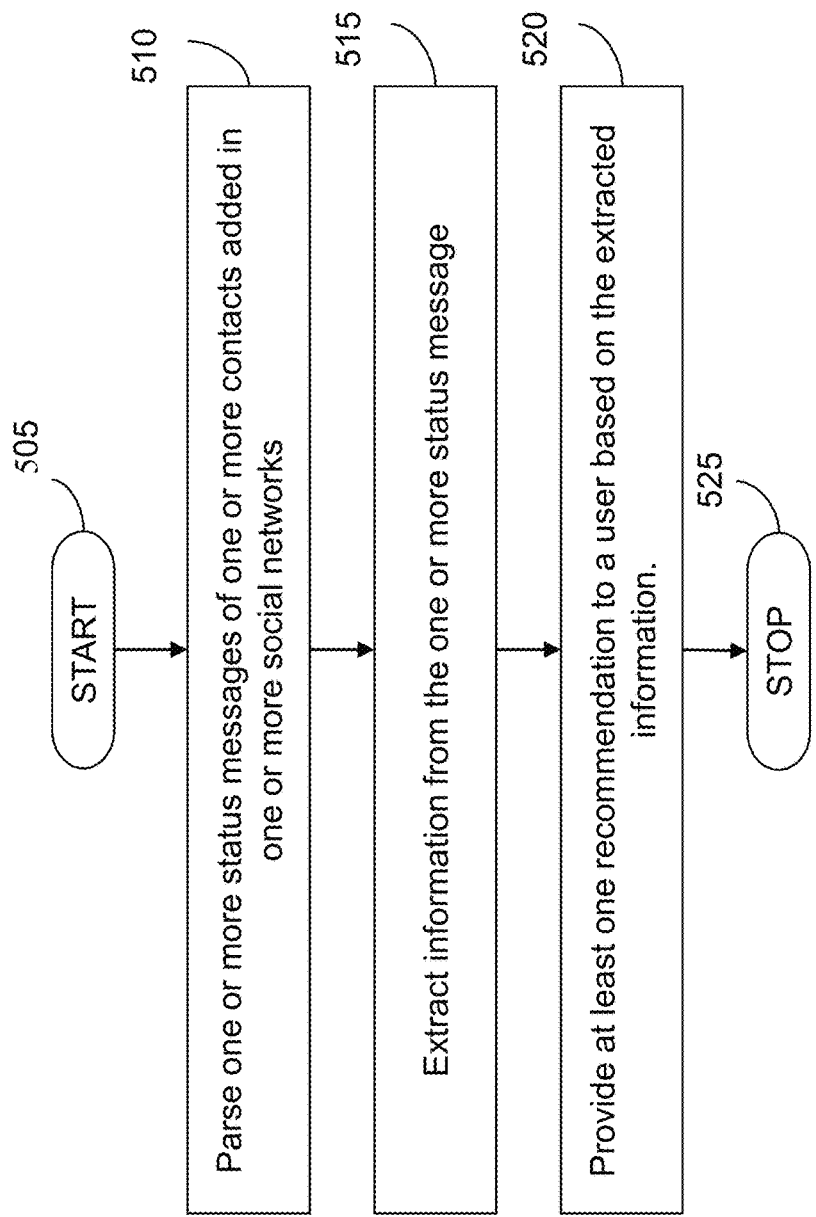
FIG. 5 illustrates a flowchart showing a method to provide recommendations based on status messages of contacts in social networks, in accordance with one embodiment.

FIG. 5 illustrates a flowchart showing a method to provide recommendations based on status messages of contacts in social networks, in accordance with one embodiment. The flowchart starts at step 505.

A user connects to a desired social application, such as Facebook, through an application such as a web browser or a widget. In some embodiments, the user connects to a plurality of social applications. Consequently, the user communicates to a number of contacts (people) linked in the connected social applications.

At step 510, one or more status messages of one or more contacts added in one or more social networks are parsed.

The social networks allow people to post a message through the aid of status messages. Status messages are a plurality of text strings conveying information of corresponding contacts. Time and again, people update their status messages in social networks and in social applications. As the number of contacts for a user increase, keeping track of updated status messages becomes cumbersome for the user. Hence, status messages of all connected social networks are parsed to identify an updated status message.

On the whole, updated status messages are identified (detected) by various methods. An exemplary method includes identifying updated status messages in notifications of user defined accounts is social networking websites. Typically, a process runs in the background to keep monitoring the notifications from social networks. Another exemplary method includes automatically identifying updated status messages of user added contacts in social applications. In this scenario, a process runs in the background to constantly monitor updates in status messages in the social networks.

An update in the status message is detected by comparing a current status to a previous status using string matching techniques and various other detection techniques. Further, one or more keywords are detected from the status message. In some embodiments, the keywords can be detected by string matching techniques or any other detection technique. For example, consider that a contact updates his status message with a new mobile number. In such a case, keywords such as "Phone number", "New number", "Number", "New Phone number", "Please update my new phone number" and "I have changed my number" is detected from the status message. Consequently, a corresponding phone number is searched from the updated status message.

In some embodiments, to avoid parsing unwanted status messages, the user can manually select contacts under various categories such as Family, Relatives, Close Friends, Colleagues and most contacted friend. The user can also select contacts randomly.

Further, updates in status of contacts are detected in social applications and in notifications. Any other possible notification techniques are used to detect an update in status of contacts.

At step 515, information is extracted from the one or more status messages. Typically, the status messages are considered to be raw data. Extraction is performed by several existing techniques, such as a Natural Language Processing (NLP) also referred to as Data mining, Information Extraction using hidden Markov models and Keyword Comparisons. NLP is a method to extract information from raw textual data.

A general method to extract information involves in checking language and grammar in the raw data (status message). Consequently, a sentence that includes a sequence of strings is obtained. By means of segmenting the sentence, various elements such as nouns, verbs and adverbs are identified. Segmenting categorizes the identified elements and ultimately information is retrieved from the raw data.

Further, examples of the extracted information includes, but is not limited to, a) Phone number updates: Consider an updated status message as "My new number at Washington is +1234456392, kindly update your contact lists". In this example, the information that is extracted is the "phone number" (+1234456392).

b) Medical Help updates: Consider an updated status message as "Looking for O+ blood group urgently, kindly contact me on +919953879832 or arihant.mnnit@gmail.com. In this example, the information is "Medical Help".

c) Query: Consider an updated status message as "Does anyone know where is Mount view Restaurant located"? In this example, the information is a query.

Further, priority of contacts can be automatically set by extracting various factors, such as social network data and most contacted contacts and so on. In some embodiments, the user has the option to list the priority of contacts. Examples of category of contacts include, but are not limited to, family, relatives, close friends, colleagues and most contacted buddies.

At step 520, one or more recommendations are provided based on the extracted information to a user. For example, if the information involves address updates, then a recommendation to update the address book is provided to the user. The recommendations are also based on one or more factors that are detected from the extracted information. The factors include mood of the contact, location of the contact, event of the contact, album titles and individual in the album.

Examples of actions includes, but is not limited to, updating address book with a new contact or a new phone number of an existing contact, re-ordering contacts, setting reminders and sending notifications to the user. An example of mood detection includes detecting a contact's mood as "happy". At this instance, happy songs can be dedicated to the contact by the user. Similarly, if the mood of a contact is detected to be "gloomy", then gift and jokes can be sent to the contact by the user.

Consider an exemplary status message such as "Happy Birthday Jack", the status message conveys that it is Jack's Birthday. Consequently, contacts of users who are mutual friends with Jack, receive a notification (action) or recommendation to wish Jack on his Birthday.

In some embodiments, the proposed invention can be performed as read and write operations on the social applications and on data stored in a database. For example, extracting updated status messages from the social applications signifies a read operation (permission) on the social application. Similarly, performing actions signifies write operation on a database (device). Further, the actions are also performed on the social applications. For this reason, the proposed invention is said to perform read and write operations.

The flowchart ends at step 525.

The basic flow of the invention is illustrated in various scenarios as described below:

Scenario 1: Consider a scenario where the use has changed his mobile number temporarily. In such a case, a status message such as "My new number in Japan for two months is 829374002", creates an additional entry. The additional entry defines the duration mapped with the temporary phone number (829374002) and subsequently saved in a database. Following two months, the user receives notification to delete the temporary phone number. Alternatively, the temporary phone number is deleted from the address book after two months.

Scenario 2: Consider a scenario where a user saves a database of blood groups corresponding to contacts found in social accounts of the user. For example, blood group "A+" is saved in the database that corresponds to a contact "Mark". Similarly, blood groups of all the contacts are saved in the database. When a contact "Mark" updates his status message saying "Urgent requirement for A+ Blood group", the proposed method detects the status message and searches for contacts with A+ blood group in the database. The resulting contacts with A+ blood group are proposed to the user recommending the user to share the resulting contact details with "Mark". In some embodiments, the resulting contacts may be shared directly with Mark.

Figure 6:
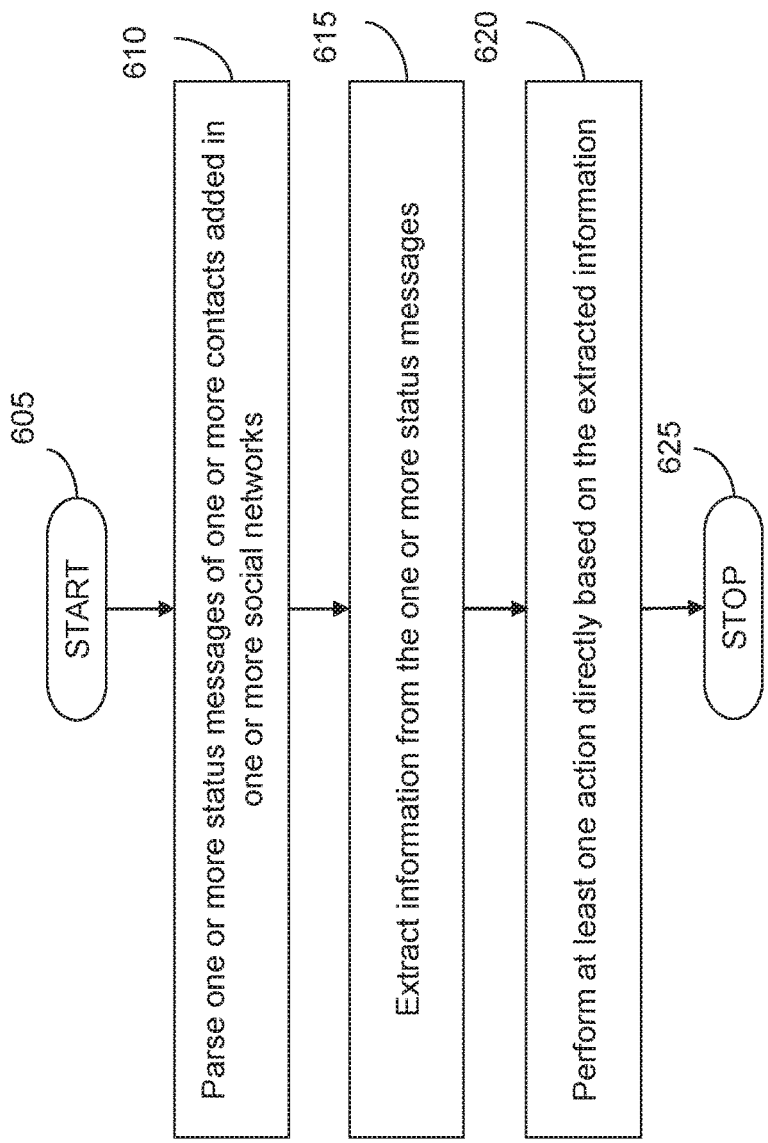
FIG. 6 illustrates a flowchart showing a method to perform actions based on status messages of contacts in social networks, in accordance with another embodiment.

FIG. 6 illustrates a flowchart showing a method to perform actions based on status messages of contacts in social networks, in accordance with another embodiment. The flowchart begins at step 605.

At step 610, one or more status messages of one or more contacts added in one or more social networks are parsed as explained in step 510.

At step 615, information is extracted from the one or more status messages as explained in step 515.

At step 620, at least one action is performed directly based on the extracted information.

The proposed invention may perform one or more actions based on the information extracted by the social updates. The user can decide whether to allow direct actions to be performed or to recommend the actions to the user. Further, the user has options to decide what kind of permissions are to be set.

The flowchart ends at step 625.

Figure 7:
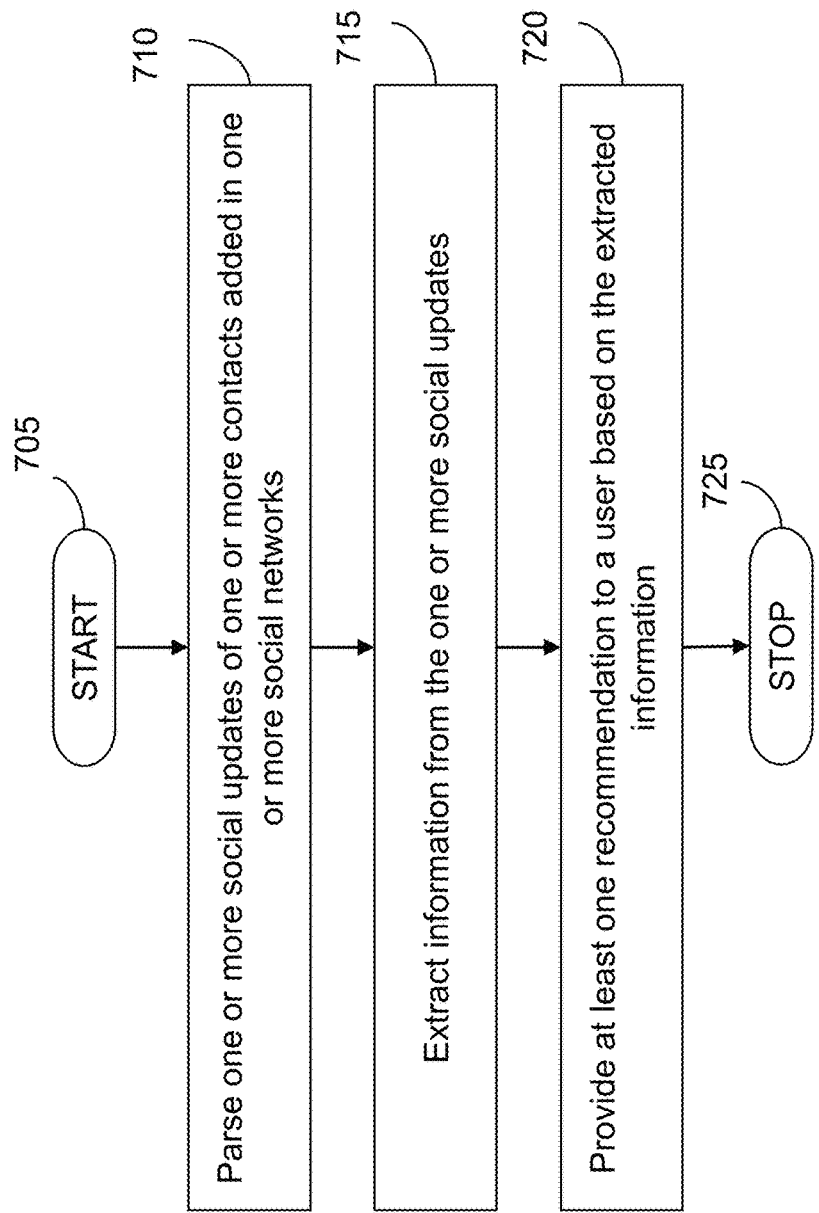
FIG. 7 illustrates a flowchart showing a method to provide recommendations based on social updates of contacts in social networks, in accordance with another embodiment.

FIG. 7 illustrates a flowchart showing a method to provide recommendations based on social updates of contacts in social networks, in accordance with another embodiment. The flowchart begins at step 705.

At step 710, one or more social updates of one or more contacts added in one or more social networks are parsed. Examples of social updates include, but are not limited, status messages and notifications that appear on a user's home page (or social profile). Examples of events include, but are not limited to, birthday notifications and photo albums upload notifications.

At step 715, information is extracted from the one or more social updates as explained in step 515.

At step 720, at least one recommendation is provided to a user based on the extracted information.

An example of a social update, is extracting event information from albums uploaded on social networks. For example, if a contact has uploaded an album containing birthday pictures, based upon the album properties, an entry in the calendar for birthday can be recommended to the user.

The flowchart ends at step 725.

Figure 8:
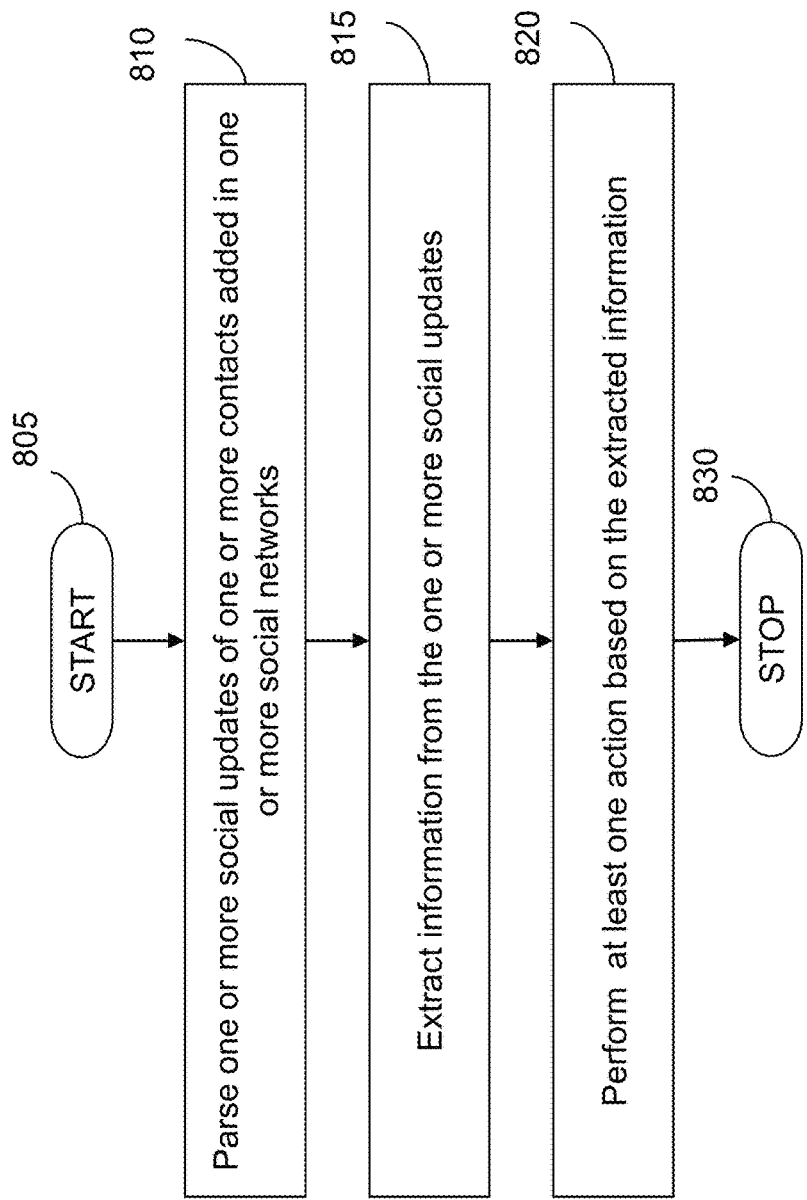
FIG. 8 illustrates a flowchart showing a method to perform actions on social updates of contacts in social networks, in accordance with yet another embodiment.

FIG. 8 illustrates a flowchart showing a method to perform actions on social updates of contacts in social networks, in accordance with yet another embodiment. The flowchart begins at step 805.

At step 810, one or more social updates of one or more contacts added in one or more social networks are parsed as explained in step 510. Examples of social updates include, but are not limited to, status messages and notifications that appear on the user's home page or profile.

At step 815, information is extracted from the one or more social updates as explained in step 515.

Further, extracted information is analyzed. The information may be meaningful but not mandatory to be useful to the user. Examples of the extracted information include, but are not limited to, phone number updates, address updates, medical help updates, birthday reminders and event reminders. Further, the user may not want to receive recommendations or an action to be performed for each and every contact. Hence, listing of contacts can be mutually done by the user or can be automatically set by analyzing various factors, such as social network data, most frequently contacted contacts and so on. In some embodiments, the user has the option to list the priority of contacts. Examples of category of contacts include, but are not limited to, family, relatives, close friends, colleagues and most contacted buddies.

Furthermore, different social updates may convey same information. In such cases, the extracted information is verified for duplicity. If the extracted information is a duplicate entry it implies that the social update is also duplicate. As a result of duplicity, the extracted information is ignored and no action is performed or recommended to the user. Further, a string of patterns from the updated social update is matched with the social update before updating. As a result of matching, similar string of patterns indicates duplicity and dissimilar string of patterns indicates a social update. As a result of duplicity, the extracted information is ignored.

At step 820, at least one action is performed directly based on the extracted information.

Typically, the actions are performed based on the analysis of information as described above.

Subsequent to the steps described at step 810 and at step 815, the proposed invention can work in the following ways:

1. Recommend an action to the user based upon the information extracted: This option will allow the system to have full control over the device memory and social applications. The proposed invention will decide the actions to be performed.

2. Perform an action based upon the information extracted: This option will allow the system to propose user appropriate actions. The actions will be performed with user's permission.

3. Other possible combinations of the above mentioned options: This option will allow the system to perform some basic actions and also notify the user about the actions. Alternatively, permission is obtained from the user to perform further actions.

Further, the action is performed directly. The actions are also performed based on the categorization as explained above and based on the criticality of the information extracted.

In some embodiments, multiple actions can be performed. For example, consider that the user updates his status message (social update) saying "My friend Rahul is looking for A+ blood group". In such a scenario, one action may include notifying the user to help Rahul. Another action may include preparing a list of A+ Blood group contacts and notifying the user to share the list with Rahul.

Similarly, consider a status message (social update) conveying "Party at John's house this weekend". For such kind of messages, a reminder (action) will be set in the user's computing device for the party. Alternatively, the reminder can also be recommended to the user. Similarly, consider a status message conveying "@Europe, New Number +44-1234-1234". In such a case multiple actions can be performed or recommended to the user. For example, an action can be to update address book of the user. Another action can be to update a new location of the contact. Furthermore, another action can be to notify user that contact is in other country, and call charges may incur extra cost.

The flowchart ends at step 825.

Figure 9:
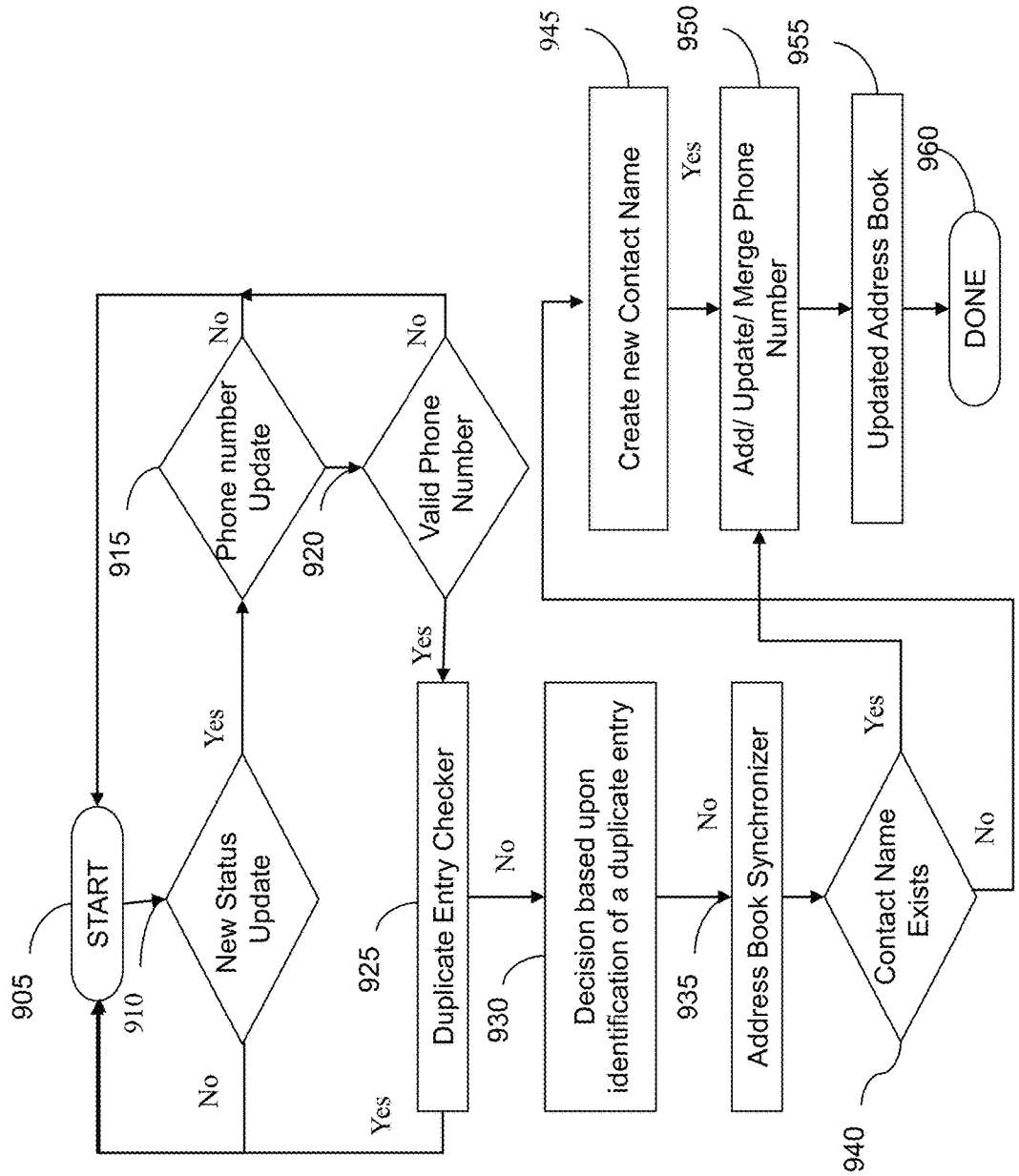
FIG. 9 is an exemplary illustration of a flowchart for updating an address book, in accordance with one embodiment.

FIG. 9 illustrates a flowchart for updating an address book, in accordance with one embodiment.

A significant use case of the method described in FIG. 6 can be distinguished with updating an address book. The flowchart begins at step 905.

At step 910, status messages are checked for an update. If there is an update, step 915 is performed. Otherwise, step 905 is performed.

At step 915, if there is an update in the status related to phone number, step 920 is performed. Otherwise, step 905 is performed.

At step 920, the phone number is checked for a valid number. Validity of the phone number can be checked based on various parameters such as country code and number of digits. If the phone number is valid, step 925 is performed else step 905 is performed.

At step 925, a duplicate entry checker identifies if the phone number is a duplicate entry or a new number. The phone number can be a duplicate entry if it has been already updated or added in the contact book. If the phone number is a duplicate entry, step 905 is performed, implying that no action is performed. If the phone number is not a duplicate entry, step 930 is performed. At step 930, a decision based upon the identification is performed.

At step 935, an address book synchronizer checks if a contact name corresponding to the phone number exists at step 940. If the contact name exists, it indicates that the phone number belongs to an already existing contact in the address book. Hence step 950 is performed. However, if the contact name does not exist in the address book, step 945 is performed.

At step 945, a new contact name is created for the phone number.

At step 950, the phone number is added, updated or merged to the corresponding contact name.

At step 955, the address book is consequently updated.

The flowchart ends at step 960.

Figure 10B:
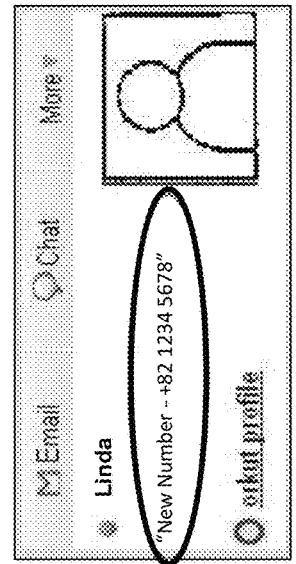
FIG. 10a, FIG. 10b and FIG. 10c are exemplary representations of various user interfaces for detecting phone number in status message, in accordance with another embodiment.
Figure 10C:
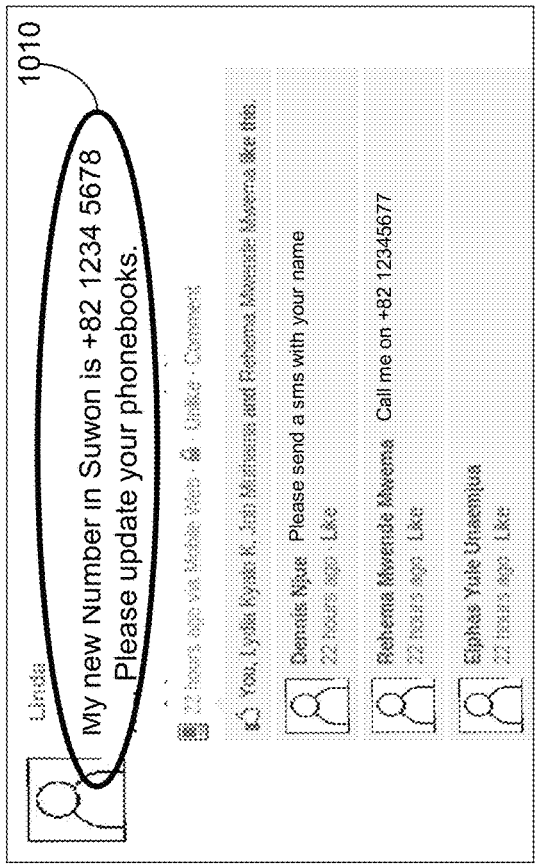
Figure 10A:
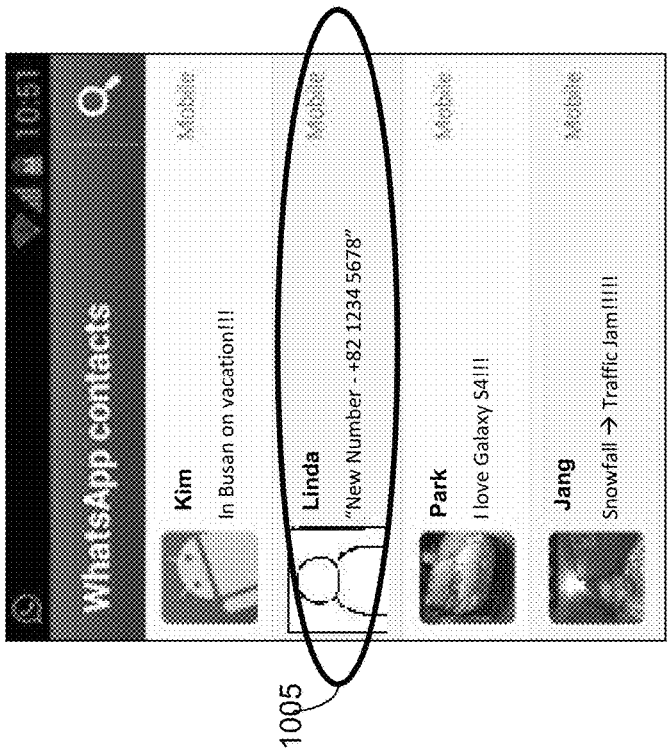

FIG. 10*a*, FIG. 10*b* and FIG. 10*c* are exemplary representations of various user interfaces for detecting phone number in status message, in accordance with another embodiment.

FIG. 10*a* illustrates a user interface on WhatsApp©. Here, a list of contacts is displayed to the user where one of the contacts "Linda" 1005 updates her status message with a new phone number.

Similarly, FIG. 10*b* illustrates a user interface on Facebook. Here, a contact "Linda" posts a message 1010 notifying others about her new phone number.

Further, FIG. 10*c* illustrates a user interface on Orkut that includes a contact's profile "Linda". "Linda" posts a message 1015 notifying others about her new phone number.

Figure 11:
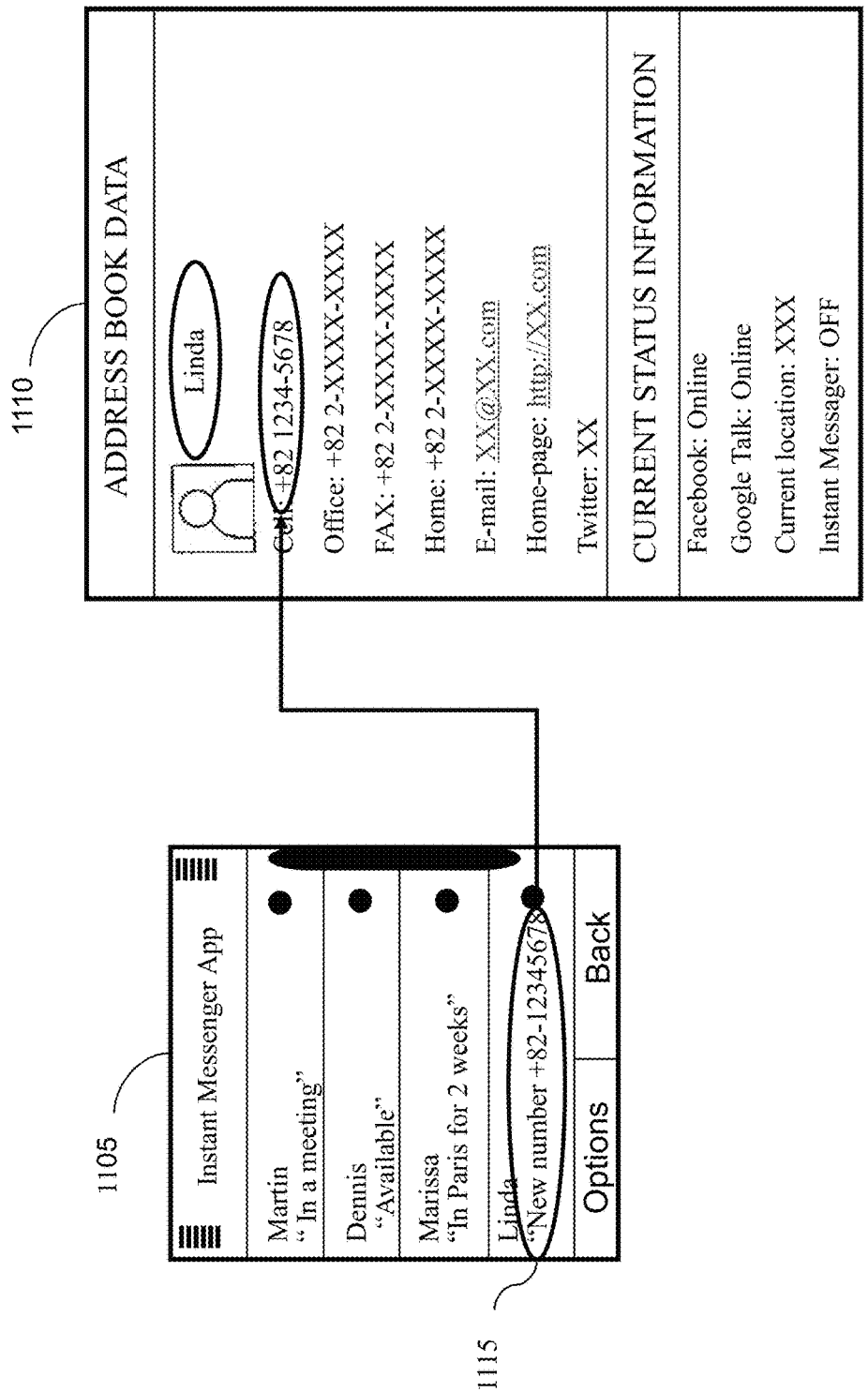
FIG. 11 is an exemplary representation of updating address book based on detection of a new phone number in the status message, in accordance with one embodiment.

FIG. 11 is an exemplary representation of updating address book based on detection of a new phone number in the status message, in accordance with one embodiment.

The exemplary representation illustrates an Instant Messenger Application 1105 and an address book data 1110. The Instant Messenger Application 1105 displays status messages of a number of contacts. For example, a contact name "Martin" displays a status message saying "In a meeting". Similarly, a status message 1115 conveying a new phone number is identified in a contact "Linda". At this point of time, the new phone number is checked for duplicity. If the new phone number already exists in the address book data 1110 no action is performed. Likewise, if the status message has been parsed earlier, no action is performed. Contrary, the new phone number is updated in the address book data 1110.

Figure 12:
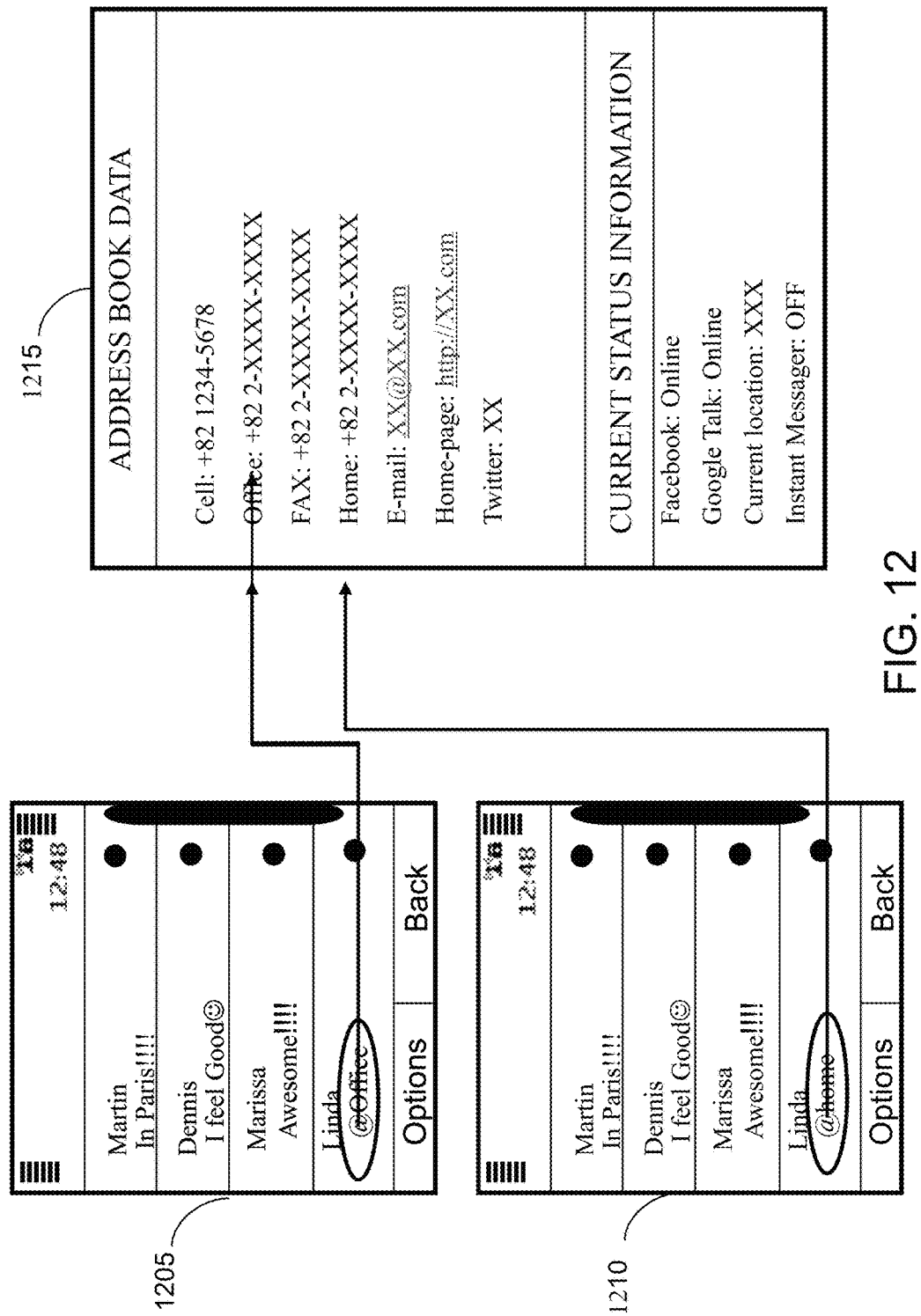
FIG. 12 is an exemplary representation of re-ordering contact numbers based on an updated location in status message, in accordance with another embodiment.

FIG. 12 is an exemplary representation of re-ordering contact numbers based on an updated location in status message, in accordance with another embodiment.

An exemplary action includes re-ordering contact numbers since several contacts include multiple contact numbers for different locations. Once, a location is updated in status message, the corresponding contact (phone) numbers are re-ordered accordingly. For example, consider that the location of Linda updates to "Office" 1205 in the status message. At this point, the contact number of "Office" changes in the address book data 1215. Similarly, when the location of Linda updates to "Home" 1210 in the status message, the contact number of "Home" changes in the address book data 1215.

Consequently, contact number is identified based on the user's current location updated in a status message.

Figure 13:
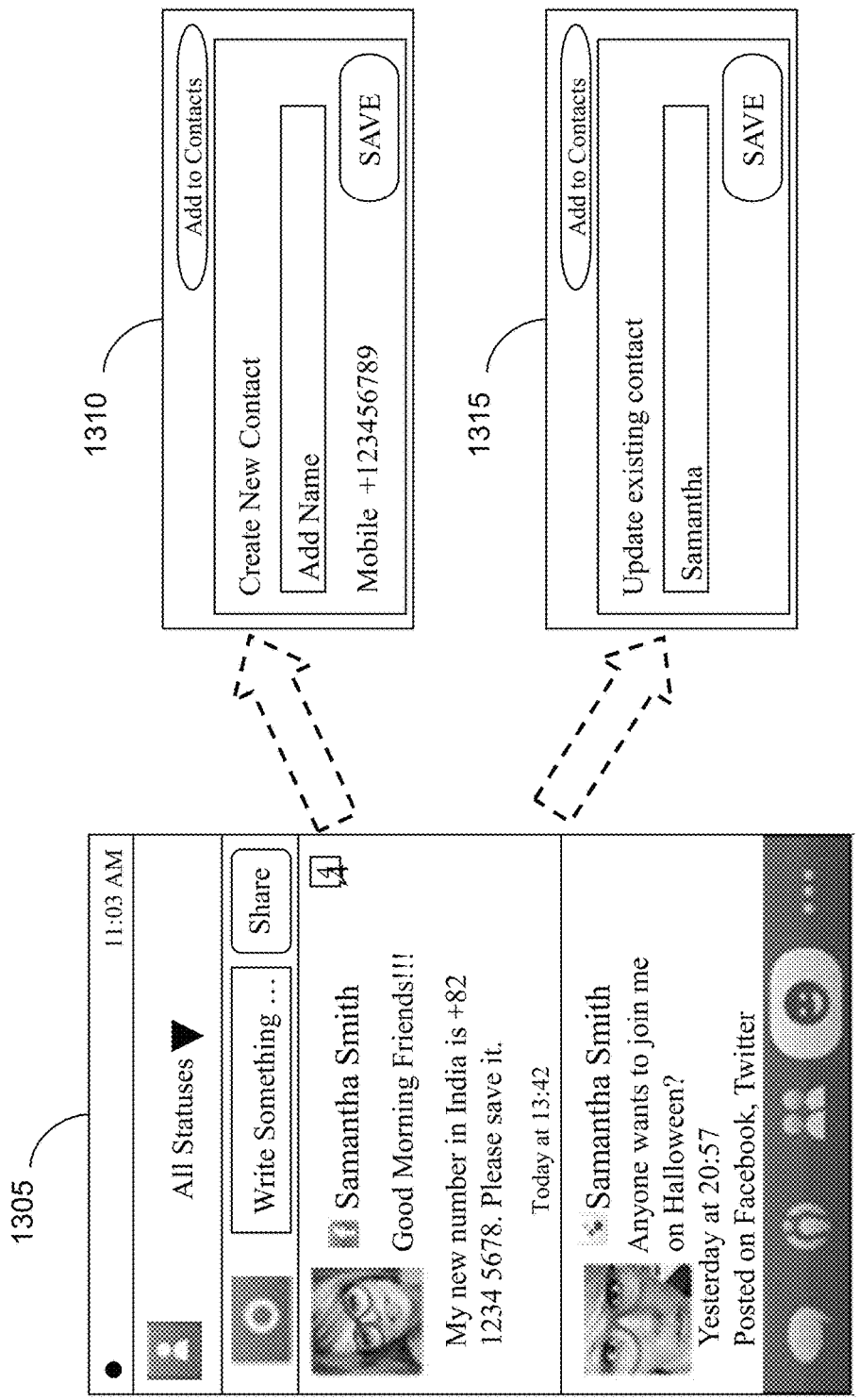
FIG. 13 is an exemplary representation of an address book synchronizer, in accordance with another embodiment.

FIG. 13 is an exemplary representation of an address book synchronizer, in accordance with another embodiment.

The address book synchronizer will basically update an address book based on the data received by the Parser. Typically, the address book synchronizer is a module to perform specific tasks. Initially, the address book synchronizer receives data from the Parser. At this moment, the data received is matched with existing contacts to verify duplicity. Based on the result of matching, a new contact is added to the address book. Alternatively, an existing contact is updated in the address book.

Consider a user interface 1305 that displays all status messages of contacts in a plurality of social applications. In such a case, a status message such as "Good Morning Friends! My new number in India is +82 12345678. Please save it", prompts to create a new contact 1310 and later add the new number in the address book. Typically, the phone number is detected in the status message. Alternatively, if the contact exists in the address book, the new number is used to update the existing contact 1315. Consequently, the address book is updated automatically.

Advantageously, the embodiments specified in the present disclosure facilitate the user to communicate to his contacts extremely easily. The communication can be extended to update other entries in address books such as email id, address and new job. The proposed invention can be helpful in various applications in Smart Phones wherein updating status messages has become a vital utility used very frequently.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

What is claimed is:

1. A method of providing recommendations based on status messages of contacts added in social networks, the method comprising:
   extracting information by parsing one or more status messages of one or more contacts added in one or more social networks; and
   providing at least one recommendation for controlling at least one application to a user based on the extracted information,
   wherein the one or more contacts is selected based on a priority of the one or more contacts.

2. The method as claimed in claim 1 wherein each of the status messages includes a plurality of text strings which represent at least one of a current status, mood, location and activity to other contacts of each of the one or more contacts.

3. The method as claimed in claim 1, wherein the extracting of information comprises:
   comparing a current status message to a previous status message; and
   identifying one or more keywords in the current status message.

4. The method as claimed in claim 1, wherein the priority of the one or more contacts is set based on at least one of social network data and frequency of contact.

5. The method as claimed in claim 1, wherein the providing of at least one recommendation further comprises:
   detecting one or more factors from the status messages; and
   recommending actions to the user based on the one or more factors detected,
   wherein the factors comprises at least one of a mood of the contact, location of the contact, event of the contact, album titles and an individual in an album.

6. The method as claimed in claim 1, wherein the providing of recommendations for controlling at least one application comprises providing at least one of updating a user's address book and updating a new location of a contact.

7. The method as claimed in claim 1, wherein the priority of the one or more contacts is set based on a selection by the user.

8. A device for providing recommendations based on social updates in social networks, the device comprising one or more processors, the one or more processors are configured to:
   extract information by parsing one or more status messages of one or more contacts added in one or more social networks, and
   provide at least one recommendation for controlling at least one application based on the extracted information to a user,
   wherein the one or more contacts are selected based on a priority of the one or more contacts.

9. The device as claimed in claim 8, wherein the priority of the one or more contacts is set based on at least one of social network data and frequency of contact.

10. The device as claimed in claim 8, wherein the priority of the one or more contacts is set based on a selection by the user.

11. The device as claimed in claim 8, wherein each of the status messages represents at least one of a current status, mood, location and activity to other contacts of each of the one or more contacts.

12. A method of performing actions based on status messages of contacts added in social networks, the method comprising:
   parsing one or more status messages of one or more contacts added in a plurality of social networks, each of the status messages includes a plurality of text strings which represents each of the one or more contacts of which the current status, mood, location and activity to other contacts;
   extracting phone number, by data mining, from the one or more status messages; and
   controlling an address book application to update a user's address book based on the extracted phone number when the phone number is not duplicate,
   wherein the one or more contacts are manually selected by a user or automatically selected using frequency of contact.

* * * * *